United States Patent [19]

Shapley

[11] 3,960,338
[45] June 1, 1976

[54] MAGNETIC TAPE CASSETTE HUB WITH TAPE RETENTION MEANS

[75] Inventor: Bruce D. Shapley, Cupertino, Calif.
[73] Assignee: K/Tronic Inc., Santa Clara, Calif.
[22] Filed: Feb. 7, 1975
[21] Appl. No.: 547,967

[52] U.S. Cl. .............................................. 242/74.1
[51] Int. Cl.² .......................................... B65H 75/28
[58] Field of Search ................. 242/74, 74.1, 74.2, 242/125.1

[56] References Cited
UNITED STATES PATENTS

| | | | |
|---|---|---|---|
| 3,195,828 | 7/1965 | Kuckhoff | 242/74.1 |
| 3,233,842 | 2/1966 | Graffon | 242/74.2 |
| 3,523,654 | 8/1970 | Zielke | 242/74.1 |
| 3,752,416 | 8/1973 | Fukatsu | 242/74 |
| 3,774,862 | 11/1973 | Rodach | 242/74 |

*Primary Examiner*—Edward J. McCarthy

[57] ABSTRACT

A magnetic tape cassette hub with an improved hub body member and tape retention means having a very low coefficient of friction is described for preventing separation therefrom of a tape also having a very low coefficient of friction. The hub described comprises a body member in which there is provided a cavity for receiving a latching member. The latching member is pivotably coupled, by means forming an integral hinging means, to the body member at one end of the cavity. On opposite sides of the hinging means, extending from the latching member and the adjoined side wall of the cavity, there is provided a pair of protruding members which overlap and are drawn together by the hinging means as the latching member is pivoted into and locked in the cavity. The tension forces thus produced in the latching member by the hinging means is found to provide a tape retention force which exceeds the yield strength of the tape even when the hub material is an acetal resin and the tape material is a polyester.

7 Claims, 3 Drawing Figures

U.S. Patent June 1, 1976 3,960,338
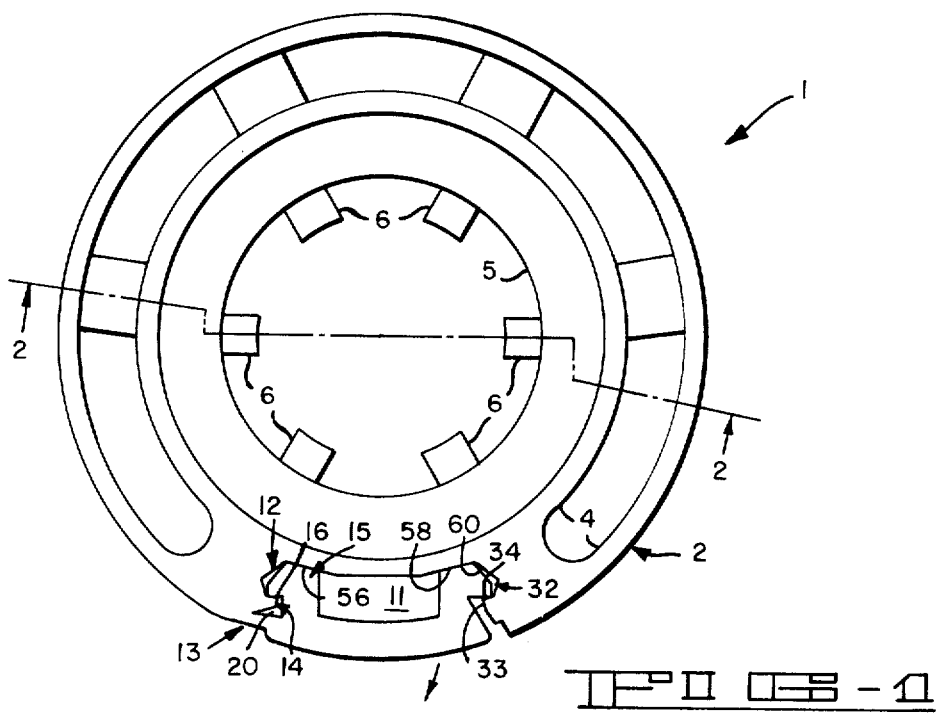
FIG-1
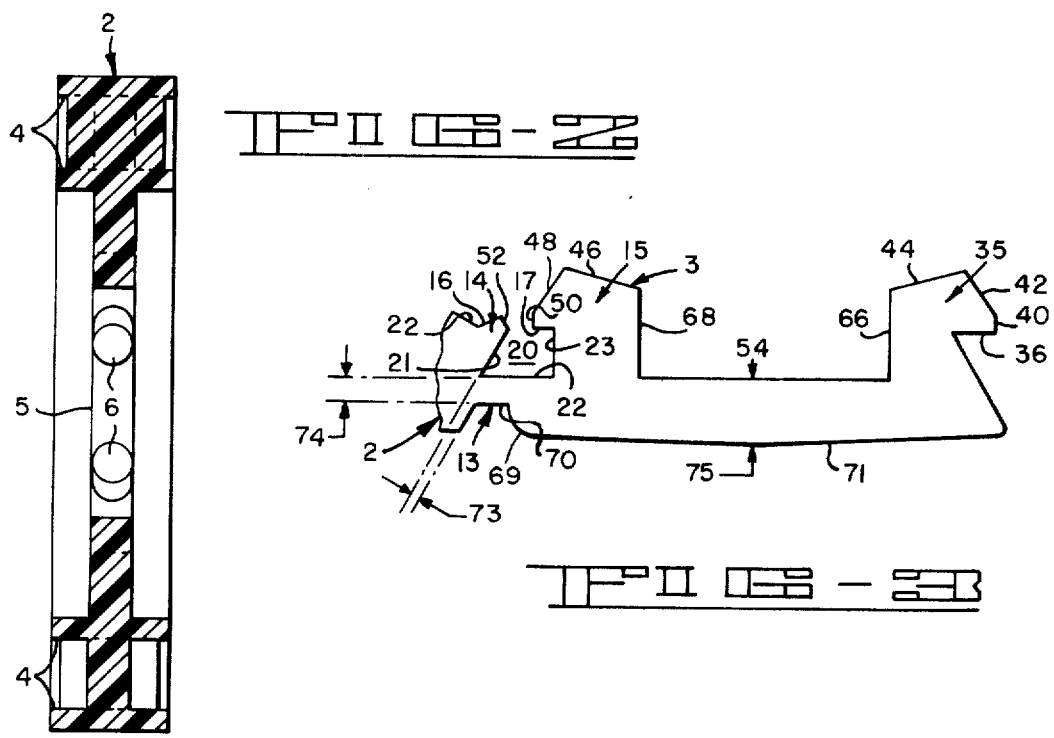
FIG-2
FIG-3

MAGNETIC TAPE CASSETTE HUB WITH TAPE RETENTION MEANS

BACKGROUND OF THE INVENTION

The present invention relates to magnetic tape cassettes in general and more particularly to a magnetic tape cassette hub having a hub body member with improved tape retention means.

In a conventional magnetic tape cassette, there is provided a pair of rotatable magnetic tape hubs which serve periodically and successively as a supply and take-up reel for magnetic tape contained in the cassette. In contrast to an endless-loop tape cartridge there is required in each of the hubs of a cassette a means for securing an end of the tape to the hub. The requirement is such that the tape will not separate from the hub even under the severe high-speed conditions encountered when the tape is re-wound from one hub to the other.

Since the early stages of cassette fabrication, a plug-like member has been provided for securing tape to a hub body member. In a typical application, the plug is press fitted into a cavity provided in a peripheral wall portion of the hub body member. When the tape is inserted in the hub, a free end is threaded about the plug-like member and held in the cavity by means of the compressive forces set up between the member and the walls of the cavity. A portion of the free end of the tape, called a "pig-tail", is generally left dangling beyond the edge of the plug at the point where the free end of the tape egresses from the cavity. In many instances, due to the difficulty of cutting and removing the pigtail, a manufacturer will not cut the pig-tail. The pig-tail can then cause a non-uniform radius in the pack resulting at times in permanent physical damage to the tape. Even when the pig-tail is cut frequently, the severed portion is left loose and may stay on the hub assembly from static electricity and later on get wound up in the tape pack. This may result, during tape take-up, in a tape pack of non-uniform radius which may, and frequently does, adversely affect speed control, reproduction or other cassette operating characteristics.

As an alternative, an approach which has been used to eliminate the problems associated with the pigtail has included using a pivotable latching member to secure tape to a hub. In this approach, a cavity is provided in a wall portion of a hub body member for receiving the latching member. The cavity and the latching member are provided with one or more male-female members between which the end of the tape is threaded and captured. The free end of the latching member is provided with a catch or locking means for engaging a portion of a side wall of the cavity. When the latching member is engaged, the male-female members are compressed into interlocking engagement for retaining the tape therebetween.

However, with the increased use of tape and hub materials of very low coefficients of friction, the prior known tape retention apparatus, including those which eliminate pig-tail problems, have proved to be less than satisfactory in their inability to retain such tape.

SUMMARY OF THE INVENTION

In view of the foregoing, a principal object of the present invention is a magnetic tape cassette hub with an improved tape retention means for preventing separation of a magnetic tape therefrom.

A further object of the present invention is a hub having a low coefficient of friction with means for retaining tape also having a very low coefficient of friction.

A still further object of the present invention is a hub having the above features and, in addition, a means for eliminating a pig-tail.

These and other objects are achieved in a preferred embodiment of the present invention by a means including a latching member pivotably coupled to a tape hub body member at one end of an elongated cavity.

The means for pivotably coupling the latching member to the body member is a hinging means which is an integral part of the hub and latching members. On opposite sides of, and contiguous with the hinging means, there is provided a pair of protruding members. Opposite the protuding members at the free end of the latching member, there is provided a locking means which engages a like means in a facing wall of the cavity for locking the latching member in the cavity.

The protruding members on opposite sides of the hinging means are positioned, and are provided with facing surfaces which overlap and are drawn together by the hinging means as the latching member is received and locked in the cavity. A small cavity is also formed between the protruding members and the hinging means for receiving an end of the tape threaded between the facing surfaces as the latching member is closed for eliminating a pig-tail.

The tension thus applied to the latching member by the hinging means and the resulting retention of a tape captured between the faces of the protruding members is found sufficient to exceed the yield strength of the tape even in cases where the hub material is an acetal resin and the tape material is a polyester.

DESCRIPTION OF THE DRAWING

These and other objects, features and advantages of the present invention will become apparent in the following detailed description of the accompanying drawings in which:

FIG. 1 is a partial plan view of a magnetic tape cassette hub in accordance with the present invention.

FIG. 2 is a cross-section view taken along lines 2—2 of FIG. 1.

FIG. 3 is an enlarged detail view of the latching member of FIG. 1 shown therein in partial plan view.

DETAILED DESCRIPTION

Referring to the drawing, there is shown in a preferred embodiment of the present invention a hub member 1, designated generally as comprising a hub body member 2 and a latching member 3.

Hub body member 2 is a wheel-shaped, relatively thin-walled, cylindrical member having a bifurcated peripheral wall 4 and an axially disposed bore 5. Equidistantly spaced and radially inwardly extending from the wall of bore 5 is a plurality of sprocket teeth 6. Teeth 6 are engaged by suitable driving means (not shown) located in a cassette utilization apparatus. The driving means and teeth 6 serve to drive the hub 1 in a conventional manner and, therefore, are not further described.

In a peripheral portion of wall 4 there is provided a first cavity 11. Latching member 3 is pivotably coupled at one end of cavity 11 and specifically to a side wall designated generally as 12 of cavity 11 by a hinging means 13. Hinging means 13 is preferably formed, as by molding, as an integral part of the hub body member 2 and latching member 3, and is commonly called a "living" hinge. On opposite sides, and contiguous with hinging means 13, there is provided a pair of protruding members 14 and 15 having a pair of surfaces 16 and 17, respectively. Member 14, having surface 16, extends inwardly toward the center of the cavity 11 from side wall 12 with surface 14 facing inwardly from the periphery of the wall 4. Member 15, having surface 17, extends generally toward member 14 with its surface 17 facing generally outwardly toward wall 4 when latching member 3 is pivoted into cavity 11.

When latching member 3 is pivoted into cavity 11, members 14 and 15 are positioned in an overlapping relationship with surfaces 16 and 17 placed in facing relationship. As members 14 and 15 are overlapped, there is also created a second cavity 20 formed by an outer wall 21 of member 14 and a pair of inner walls 22 and 23 of hinging means 13. Cavity 20 is formd to contain a pigtail.

Opposite side wall 12 of cavity 11 there is provided a further side wall, designated generally as 32. Extending inwardly from side wall 32, there is provided a locking member 33 having a shoulder 34 for receiving a corresponding shouldered member 35 provided at the end of latching member 3 opposite hinging means 13. Shouldered member 35 having a shoulder 36 is formed to engage shoulder 34 for locking latching member 3 in cavity 11 after the former member has been pivoted into cavity 11.

Referring to FIG. 3, the shape, position and relative dimensions of members 14 and 15 and hinging means 13 are chosen such that tensile forces, as distinguished from compressive forces, are generated in latching member 3 for drawing latching member 3 against body member 2 when member 3 is latched in cavity 11. More specifically, the tensile forces referred to are generated by the hinging means 13 in the vicinity of member 15 of latching member 3 such that surface 17 of the latter member is drawn toward surface 16 of member 14. To effect these tensile forces in a typical embodiment of the present invention, relative dimensions of the pertinent parts listed in the following table may be employed wherein the numbers in the left hand column identify a surface and the numbers in the right hand column are approximate typical dimensions of the length or radius of or distance between the surfaces identified in inches.

| Item | Dimension |
| --- | --- |
| 16 | .015 |
| 17 | .015 |
| 21 | .040 |
| 22 | .050 |
| 23 | .030 |
| 33 | .010 |
| 34 | .015 |
| 36 | .030 |
| 40 | .010 |
| 42 | .035 |
| 44 | .050 |
| 46 | .050 |
| 48 | .035 |
| 50 | .010 |
| 52 | .010 |
| 54 | .170 |
| 56 | .070 |
| 58 | .070 |
| 60 | .035 |
| 66 | .060 |

-continued

| Item | Dimension |
| --- | --- |
| 68 | .060 |
| 69 | .02 radius |
| 71 | .342 with 2.50 radius |
| 72 | .020 |
| 73 | .010 |
| 74 | .020 |
| 75 | .040 |

In the process of securing tape to hub 1, latching member 3 is pivoted away from cavity 11 in a clockwise direction for forming a mouth or tape entryway for threading a length of tape into cavity 20. The tape is then caused to wrap around the adjacent surfaces of members 15 and 35 of the member 3. When member 3 is locked in cavity 11, as the member 3 is pivoted in a counter-clockwise fashion into cavity 11, the tape will egress from cavity 11 between member 3 and side wall 32 of the cavity. The tape will also be captured between surfaces 16 and 17 of members 14 and 15. Because of the capturing force which develops between surfaces 16 and 17, it has been found that even when using materials such as an acetal resin for the hub parts and a polyester for the tape, both of which have very low coefficients of friction, sufficient holding force exists to exceed the yield strength of the tape before separation of the tape from the hub member occurs.

While a preferred embodiment has been described to illustrate the present invention, it is understood that obvious departures may be made in various respects to one or more of the features illustrated within the spirit and scope of the present invention. It is, therefore, intended that all such departures and their equivalents shall be considered within the scope of the present invention as hereinafter claimed.

What is claimed is:

1. In a tape hub having a hub body member and a latching member with means for latching the latching member to said body member for securing tape in a cavity in said body member, the improvement comprising:

a first member having a facing surface protruding from said body member;

a second member having a facing surface protruding from said latching member;

a means for positioning said first and said second members in an overlapping relationship; and a means applying a tensile force to said second member protruding from said latching member for drawing together said facing surface of said second member and said facing surface of said first member when said members are in said overlapping relationship, said drawing together serving to retain tape between said facing surfaces.

2. A tape hub according to claim 1 wherein said means applying a tensile force to said latching member comprises a hinging means for pivotably coupling said latching member to said body member.

3. A tape hub according to claim 2 wherein said first and said second protruding members are located on opposite sides of and contiguous with said hinging means.

4. A tape hub according to claim 2 wherein said latching member is an elongated, generally U-shaped member, with said means for latching said latching member to said body member located at one end of said latching member and with said hinging means for pivotably coupling said latching member to said body member located at the opposite end of said latching member.

5. A tape hub according to claim 4 wherein said hinging means is formed as an integral part of and inseparable from said body member and said latching member and said first and said second protruding members are located adjacent and on opposite sides of said hinging means.

6. A magnetic tape cassette hub comprising:
a hub body member;
an elongated latching member movable between an open and a closed position;
a means forming a first cavity in said hub body member for receiving said latching member;
a means at one end of said latching member and said first cavity for forming a second cavity when said latching member is moved to said closed position, said second cavity being formed to receive and retain a portion of the end of a tape;
and
a means for urging said one end of said latching member radially outwardly for binding said tape between said second cavity forming means when said latching member is in said closed position.

7. A hub according to claim 6 further comprising: a means for pivotably coupling said one end of said latching member to said one end of said cavity and wherein said means for urging said one end of said latching member radially outwardly comprises said coupling means.

* * * * *